US010621898B2

(12) United States Patent
Prema et al.

(10) Patent No.: US 10,621,898 B2
(45) Date of Patent: Apr. 14, 2020

(54) MULTI-LAYER DISPLAY SYSTEM FOR VEHICLE DASH OR THE LIKE

(71) Applicant: PURE DEPTH LIMITED, Auckland (NZ)

(72) Inventors: Vijay Ramesh Prema, Auckland (NZ); Alvin Buo Chieng Tea, Auckland (NZ)

(73) Assignee: PURE DEPTH LIMITED (NZ)

( * ) Notice: Subject to any disclaimer, the term of this patent is extended or adjusted under 35 U.S.C. 154(b) by 344 days.

(21) Appl. No.: 15/359,732

(22) Filed: Nov. 23, 2016

(65) Prior Publication Data

US 2018/0144673 A1 May 24, 2018

(51) Int. Cl.
*G09G 3/00* (2006.01)
*G09G 3/20* (2006.01)
*B60K 37/02* (2006.01)
G09G 3/3208 (2016.01)
G09G 3/36 (2006.01)

(52) U.S. Cl.
CPC ............ *G09G 3/003* (2013.01); *B60K 37/02* (2013.01); *G09G 3/2003* (2013.01); *G09G 3/2007* (2013.01); *B60K 2370/155* (2019.05); *B60K 2370/1531* (2019.05); *B60K 2370/31* (2019.05); *B60K 2370/347* (2019.05); *G09G 3/3208* (2013.01); *G09G 3/36* (2013.01); *G09G 2300/023* (2013.01); *G09G 2320/028* (2013.01); *G09G 2380/10* (2013.01)

(58) Field of Classification Search
CPC .... B60K 2350/1072; B60K 2350/2017; B60K 2350/2056; B60K 2350/2065; B60K 37/02; G09G 2300/023; G09G 2380/10; G09G 3/003; G09G 3/2003; G09G 3/2007; G09G 3/3208; G09G 3/36
See application file for complete search history.

(56) References Cited

U.S. PATENT DOCUMENTS

| | | | |
|---|---|---|---|
| 6,909,556 B2 | 6/2005 | Berman et al. | |
| 7,347,558 B2 | 3/2008 | Berman | |
| 7,710,389 B2 | 5/2010 | Kazmaier et al. | |
| 2007/0024642 A1* | 2/2007 | Kooi | H04N 13/395 345/629 |
| 2008/0125219 A1* | 5/2008 | Williams | G07F 17/3202 463/31 |
| 2008/0136741 A1* | 6/2008 | Williams | G07F 17/32 345/3.3 |

(Continued)

*Primary Examiner* — Viet D Pham
(74) *Attorney, Agent, or Firm* — Craig A. Baldwin (57) ABSTRACT

A multi-layer display system may include three, four, or more display panels/screens arranged in an overlapping manner, a backlight configured to provide light to the plurality of display screens, and a processing system. The processing system may be configured to display, on a first display screen of the plurality of display screens, a first image including a first gradient area, display, on a second display screen of the plurality of display screens, a second image including a second gradient area, and display, on a third display screen arranged in an overlapping manner between the first display screen and the second display screen, a third image including. The third image may include a third gradient area overlapping at least a portion of the first gradient area displayed on the first display screen and at least a portion of the second gradient area displayed on the second display screen.

24 Claims, 7 Drawing Sheets

(56) References Cited

U.S. PATENT DOCUMENTS

| | | |
|---|---|---|
| 2009/0027755 A1* | 1/2009 | Stellbrink ........... G02F 1/13473 359/259 |
| 2011/0249026 A1 | 10/2011 | Singh |
| 2014/0035942 A1* | 2/2014 | Yun ........................ G09G 5/006 345/592 |
| 2014/0184669 A1* | 7/2014 | Oh ........................ G09G 3/3208 345/694 |
| 2015/0323805 A1 | 11/2015 | Bell |
| 2016/0012630 A1 | 1/2016 | Bell |
| 2016/0049109 A1 | 2/2016 | Engel et al. |

* cited by examiner

MULTI-LAYER DISPLAY SYSTEM FOR VEHICLE DASH OR THE LIKE

BACKGROUND

The invention relates generally to displays and, more particularly, to display systems and methods for displaying three-dimensional graphics on a multi-layer displays.

Image displays limited to a single two dimensional display lack depth information. To relay depth information of the objects there have been efforts to provide displays that can display the objects in three-dimensions. For example, stereo displays convey depth information by displaying offset images that are displayed separately to the left and right eye. However, stereo displays are limited from what angle an observer may view the display. In addition, stereo displays may cause various discomforting symptoms, such as eye strain, blurred vision, and double vision.

Multi-layer displays have also been developed to display objects with a realistic perception of depth. Multi-layer displays conventionally have two display screens in a stacked arrangement to provide real depth between images displayed on the first display screen and images displayed on the second display screen. However, such systems are limited in displaying certain three-dimensional effects for the displayed objects. For example, it is difficult to display a volumetric blended surface for the object with a multi-layer display including two display screens.

SUMMARY

Exemplary embodiments provide a display system that can provide visual depth information using a multi-layer display including three or more display screens (e.g., LCDs) and/or layers provided in a stacked arrangement. Visual depth information of displayed objects may be provided by displaying corresponding gradients on multiple display screens. For example, the corresponding gradients may be displayed on three, four, or more adjacent LCD or OLED display screens to provide depth information of the object to an observer.

In certain example embodiments of this invention, there is provided a multi-layer display system for displaying three-dimensional images, comprising: at least first, second, and third display screens arranged in a substantially parallel and overlapping manner; a light source configured to provide light to at least one of the display screens; and a processing system comprising at least one processor and memory, the processing system configured to: display on the first display screen a first image including a first gradient area; display on the second display screen a second image including a second gradient area; display on the third display screen a third image including a third gradient area overlapping at least a portion of the first gradient area and at least a portion of the second gradient area, wherein the third display screen is provided between at least the first and second display screens, so that at least the first, second, and third gradient areas of at least the first, second, and third display screens, respectively, can form a gradient for portraying an inclined surface of an object to a viewer in a three dimensional graded manner with color of the inclined surface of the object progressively changing from a first level closer to the viewer to a different second level farther from the viewer.

Gradients may be used to show, to a viewer, things such as slopes along edges/sides of a speedometer or other dashboard needle. Gradients can be used to better shown sloped surfaces to a viewer in a three dimensional manner. An example gradient would fade from a dark color (e.g., dark grey) at the front of the display apparatus to a light color (e.g., light grey) at or near the rear of the display apparatus, in order to better show a three dimensional image of a movable needle (e.g., speedometer needle, oil pressure needle, temperature needle, fuel level needle, etc.) to an operator of the vehicle. For instance, a main body of a needle may be a darkest color (e.g., dark grey) as shown by the display panel closest to the viewer, and sides or edges of the needle may get progressively lighter of that color (e.g., lighter grey) in display panels moving further rearward away from the viewer, such that the lightest version of that color (lightest grey) would be emitted from the rear-most display panel for very edges/sides of the needle. Another example gradient could be used to display the rim around a gauge needle, and would fade the rim color from a dark color (e.g., dark grey) at the front of the display apparatus to a light color (e.g., light grey) at or near the rear of the display apparatus (or vice versa), in order to better show a three dimensional image of the rim to an operator of the vehicle.

In another exemplary embodiment, there may be provided a non-transitory computer-readable storage medium having stored therein a program for execution a processing system of a display system. The program, when executed, may cause the processing system to control a first display screen to display a first image including a first gradient area, control a second display screen, arranged in an overlapping manner with the first display screen, to display a second image including a second gradient area, and control a third display screen, arranged in an overlapping manner between the first display screen and the second display screen, to display a third image. The third image may include a third gradient area overlapping at least a portion of the first gradient area displayed on the first display screen and at least a portion of the second gradient area displayed on the second display screen.

In another exemplary embodiment, a computer implemented method may include receiving data including a plurality of graphics for display of three-dimensional objects, displaying a first graphic of the plurality of graphics on a first display screen, the first graphic including a first gradient, displaying a second graphic of the plurality of graphics on a second display screen arranged in an overlapping manner with the first display screen, the second graphic including a second gradient, and displaying a third graphic of the plurality of graphics on a third display screen arranged in an overlapping manner between the first display screen and the second display screen. The third graphic may include a third gradient, the third gradient, when displayed, may overlap at least a portion of the first gradient displayed on the first display screen and at least a portion of the second gradient displayed on the second display screen.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Figure 1:
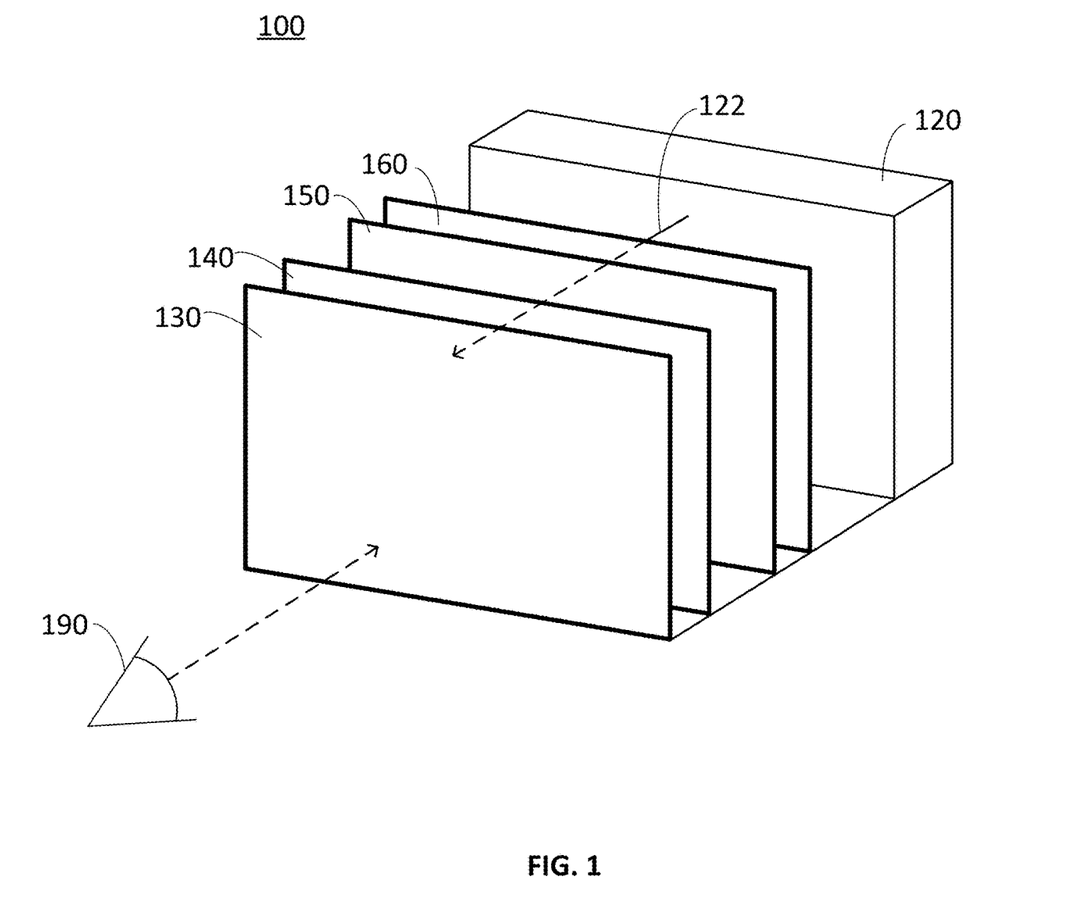
FIG. 1 illustrates a display system according to an embodiment of the present disclosure.

FIG. 1 illustrates a display system 100 according to an embodiment of the present disclosure. The display system 100 may include a light source 120 (e.g., rear mounted light source, side mounted light source, optionally with a light guide), and a plurality of display screens 130-160. The display screens 130-160 may be disposed substantially parallel or parallel to each other and/or a surface (e.g., light guide) of the light source 120 in an overlapping manner. In one embodiment, the light source 120 and the display screens 130-160 may be disposed in a common housing. The display apparatus 100 may be provided at the dash of a vehicle in example embodiments of this invention, in order to show the viewer images such as a speedometer, gauges such as oil pressure or fuel level gauges, navigation, etc. It should be appreciated that the elements illustrated in the figures are not drawn to scale, and thus, may comprise different shapes, sizes, etc. in other embodiments.

The display system 100 may display graphical information to a viewer/observer 190, such as an operator or passenger of a vehicle, by displaying information including a gradient on two, three, or more of the display screens 130-160 simultaneously. To mimic depth cues of the displayed object, portions of the same object can be displayed with different gradients of a given color or the like on different display screens 130-160. For example, each of the display screen 130-160 may be controlled to display a different portion of a gauge and/or needle found in a traditional vehicle instrument panel. In certain embodiments, each of the display screen 130-160 may be controlled to display a different portion of an image (e.g., clock, gauge and/or needle(s)) of a watch device to be worn in the wrist of a user, or the like.

Gradients can be used to better shown sloped/inclined surfaces to a viewer in a three dimensional manner. An example gradient would fade from a dark color (e.g., dark grey) at the front of the display apparatus to a light color (e.g., light grey) at or near the rear of the display apparatus, in order to better show a three dimensional image of a movable needle (e.g., speedometer needle, oil pressure needle, RPM needle, clock needle, temperature needle, fuel level needle, etc.) to an operator of the vehicle, or vice versa. For instance, a main body of a needle may be a darkest color (e.g., black or dark grey) as shown by the display panel 130 closest to the viewer, and sides or edges of the needle may get progressively lighter of that color (e.g., lighter grey or white) in display panels 140, 150 moving further rearward away from the viewer, such that the lightest version of that color (lightest grey) would be emitted from the rear-most display panel 160 for very edges/sides of the needle. The opposite gradient may also be provided, in particular a main body of a needle may be a light color (e.g., white or light grey) as shown by the display panel 130 closest to the viewer, and sides or edges of the needle on the inclined surface may get progressively darker (e.g., to dark grey or black) in display panels 140, 150 moving further rearward away from the viewer, such that the lightest level would be emitted from the forward-most display panel 160 for that object having an inclined surface. Another example gradient could be used to display the rim around a gauge needle, and would fade the rim color from a dark color (e.g., dark grey) at the front of the display apparatus to a light color (e.g., light grey) at or near the rear of the display apparatus (or vice versa), in order to better show a three dimensional image of the rim to an operator of the vehicle. See, for example, the rim having a sloped/inclined surface surrounding the needle in FIG. 4. For instance, a portion of the rim closest to the viewer may be a darkest color (e.g., dark grey) as shown by the display panel 130 closest to the viewer, and the body of the rim moving rearward may get progressively lighter of that color (e.g., lighter grey) in display panels 140, 150 moving further rearward away from the viewer, such that the lightest version of that color (lightest grey) would be emitted from the rear-most display panel 160 for the rearmost portion of the rim. Of course, the gradient could be arranged in the opposite manner for the rim, so that the lightest color (e.g., grey) is for the portion of the rim closest to the viewer and the darkest color (e.g., grey or black) is for the portion of the rim farthest from the viewer.

The gradients above refer, for example, to dark and light colors forming gradients, where for example the darkest color may be at the center of an object displayed by a first panel and a lightest or lighter color may be provided at an outer part of the object for another panel (or vice versa). The darker color is generally desired to be opaque or substantially opaque, while the lighter color may or may not be transparent or substantially transparent from the point of view of the viewer. This may be used, for example, in a four polarizer LCD MLD configuration (multiplicative), but this invention is not limited to gradients having just dark and light colors. More generally, in example embodiments of this invention the gradients are designed so that a center or central area of an object is opaque or substantially opaque (e.g., displayed by a panel/screen closer to the viewer) and the gradient fades sides and/or edges of the object to transparent or partially transparent via a panel/screen farther from the viewer), so as to portray a three dimensional image of the object. For example, in a two polarizer optical configuration, dark colors may be transparent and light colors may be opaque or solid, so there may be used a light-to-dark gradient on the first layer to achieve opaque-to-transparent gradient. In a high frequency panel configuration, one may generate an image with alpha transparency value from opaque-to-transparent. In a TOLED panel configuration, for example, each pixel may be transparent or emit light so again we may use a different gradient from emissive to transmissive.

The light source 120 may be configured to provide illumination for the display system 100. The light source 120 may provide substantially collimated light 122 that is transmitted through the display screens 130-160.

Optionally, the light source 120 may provide highly collimated light using high brightness LED's that provide for a near point source. The LED point sources may include pre-collimating optics providing a sharply defined and/or evenly illuminated reflection from their emission areas. The light source 120 may include reflective collimated surfaces such as parabolic mirrors and/or parabolic concentrators. In one embodiment, the light source 120 may include refractive surfaces such as convex lenses in front of the point source. However, the LEDs may be edge mounted and direct light through a light guide which in turn directs the light toward the display panels in certain example embodiments.

Each of the display panels/screens 130-160 may include a liquid crystal display (LCD) matrix. Alternatively, the display screens 130-160 may include organic light emitting diode (OLED) displays, transparent light emitting diode (TOLED) displays, cathode ray tube (CRT) displays, field emission displays (FEDs), field sequential display or projection displays. In one embodiment, the display panels 130-160 may be combinations of either full color RGB, RGBW or monochrome panels. The display screens 130-160 are not limited to the listed display technologies and may include other display technologies that allows for the projection of light. In one embodiment, the light may be provided by a projection type system including a light source and one or more lenses and/or a transmissive or reflective LCD matrix. The display screens 130-160 may include a multi-layer display unit including multiple stacked or overlapped display layers each configured to render display elements thereon for viewing through the uppermost display layer.

In one embodiment, each of the display screens 130-160 may be approximately the same size and have a planar surface that is parallel or substantially parallel to one another. In another embodiment, one or more of the display screens 130-160 may have a curved surface. In one embodiment, one or more of the display screens 130-160 may be displaced from the other display screens such that a portion of the display screen is not overlapped and/or is not overlapping another display screen.

Each of the display screens 130-160 may be displaced an equal distance from each other in example embodiments. In another embodiment, the display screens 130-160 may be provided at different distances from each other. For example, a second display screen 140 may be displaced from the first display screen 130 a first distance, and a third display screen 150 may be displaced from the second display screen 140 a second distance that is greater than the first distance. The fourth display screen 160 may be displaced from the third display screen 150 a third distance that is equal to the first distance, equal to the second distance, or different from the first and second distances.

The display screens 130-160 may be configured to display graphical information for viewing by the observer 190. The viewer/observer 190 may be, for example, a human operator or passenger of a vehicle, or an electrical and/or mechanical optical reception device (e.g., a still image, a moving-image camera, etc.). Graphical information may include visual display of objects and/or texts. In one embodiment, the graphical information may include displaying images or a sequence of images to provide video or animations. In one embodiment, displaying the graphical information may include moving objects and/or text across the screen or changing or providing animations to the objects and/or text. The animations may include changing the color, shape and/or size of the objects or text. In one embodiment, displayed objects and/or text may be moved between the display screens 130-160. The distances between the display screens 130-160 may be set to obtain a desired depth perception between features displayed on the display screens 130-160.

In one embodiment, a position of one or more of the display screens 130-160 may be adjustable by an observer 190 in response to an input. Thus, an observer 190 may be able to adjust the three dimension depth of the displayed objects due to the displacement of the display screens 130-160. A processing system may be configured to adjust the displayed graphics and gradients associated with the graphics in accordance with the adjustment.

Each of the display screens 130-160 may be configured to receive data and display, based on the data, a different image on each of the display screens 130-160 simultaneously. Because the images are separated by a physical separation due to the separation of the display screens 130-160, each image is provided at a different focal plane and depth is perceived by the observer 190 in the displayed images. The images may include graphics in different portions of the respective display screen.

While not illustrated in FIG. 1, the display system 100 may include one or more projection screens, one or more diffraction elements, and/or one or more filters between an observer 190 and the projection screen 160, between any two projection screens 130-160, and/or the projection screen 130 and the light source 120.

Figure 2:
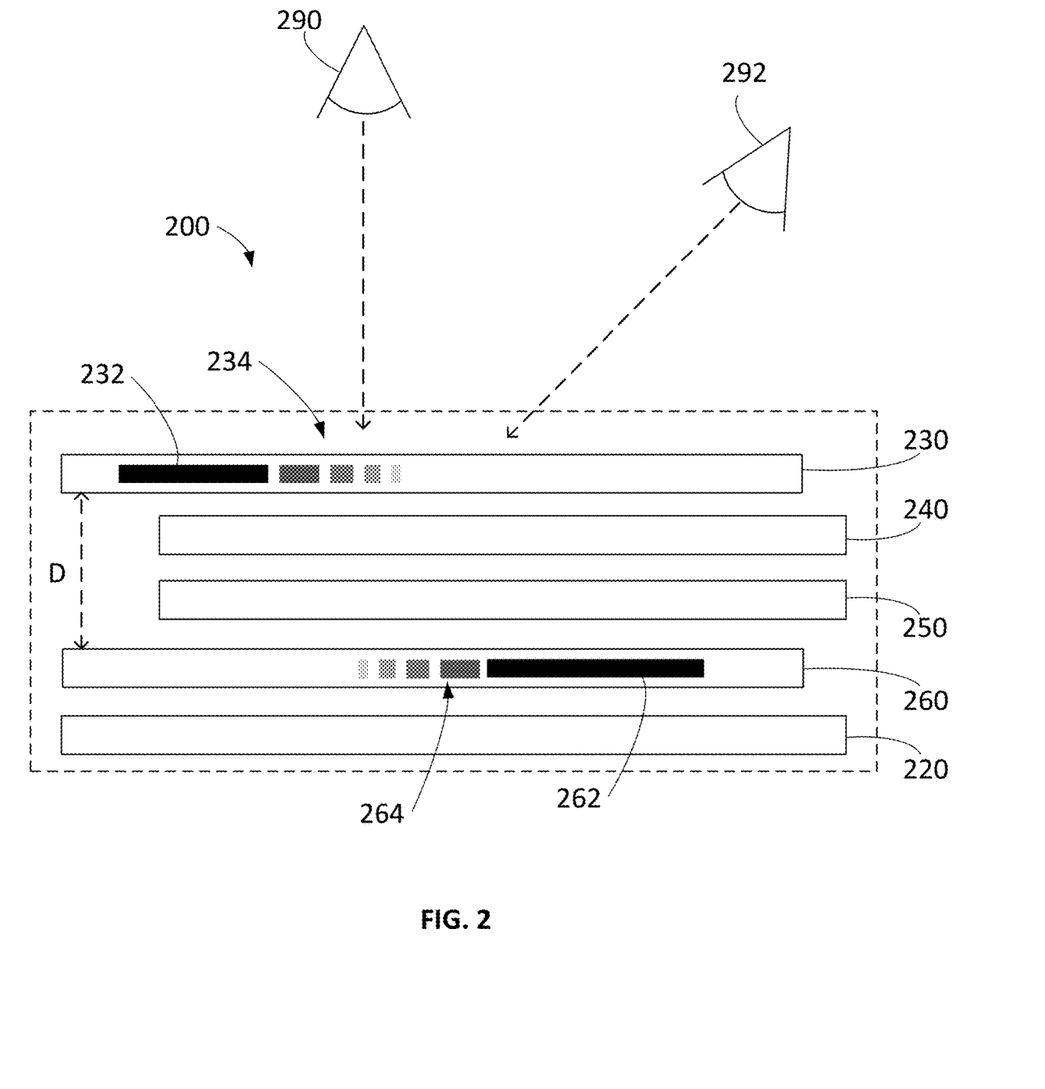
FIG. 2 illustrates a display system according to another embodiment of the present disclosure.

FIG. 2 illustrates a display system 200. The display system 200 may include a light source 220, a first a display screen 230, and a second display screen 260. The first display screen may be a screen that is nearest to the observer 290 and the second display screen 260 may be a screen that is adjacent and/or nearest to the light source 220. The display system may further include a plurality of additional display screens 240 and 250 between the first display screen 230 and the second display screen 260. As illustrated in FIG. 2, the plurality of additional display screens 240 and 250 may or may not display graphics.

As with the FIGS. 1 and 3-7 embodiments, a processing system may control the first display screen 230 to display a first graphic 232 that includes blending 234 and control the second display screen 260 to display a second graphic 262 that includes blending 264. The blending 234 of the first graphic 232 and the blending 264 of the second graphic 262 may be provided at edges of the respective graphics. The blending 234 of the first graphic 232 and the blending 264 of the second graphic 262 may distribute a target graphic to be displayed between the first display screen 230 and the second display screen 230. Thus, an observer 290 viewing the blending 264 via the blending 234 may see a graphic with a three-dimensional perception due the displacement of the display screens.

The blending on the display screens may be displayed using gradients providing a smooth transition. Providing the gradient may involve splitting a portion of a two-dimensional image between the first and second display screens and providing an overlapping portion with blending of the image between the two display screens. The gradient may be provided by varying the pixel intensity of overlapping portions of the graphics displayed in the first and second display screens. The gradient in overlapping portions of the display screens may be a reverse to each other. The gradient may be applied to one or more colors of displayed graphics.

While the graphics are displayed on different screens, the composite image using the gradients is perceived by the observer 290 as being distributed between the physically displaced display screens with portions at some point intermediate, on, in front of or behind the display screens. Using this approach, the displayed composite graphic with the gradients may provide volumetric blended surfaces using the first blending 234 and the second blending 264. For example, the gradients may be used to display perception of slopes between a first planar graphic displayed on the first display screen 230 and a second planar graphic displayed on the second display screen 260.

As illustrated in FIG. 2, when looking at the gradients from the center viewing angle, such as by the observer 290, the gradients may appear to seamlessly blend together. However, when looking at the gradients from another location, such as location of observer 292, breaks in the gradient may be observed due to the physical separation of the display screens D. To reduce the locations at which such breaks in the gradients may be observed, the separation of the display screens D may be decreased. However, decreasing the separation of the display screens D may reduce the degree of three-dimensional depth that can be portrayed in the display system 200. To increase the viewing angles at which a three-dimensional image can be viewed without breaking in the gradient, while maintaining a desired separation of the display screen, a plurality of additional display screens 240 and 250 may be provided between the first display screen 230 and the second display screen 260 in order to improve viewing characteristics of the gradient at off-axis viewing angles (e.g., at a 30 or 45 degree viewing angle from normal).

Figure 3:
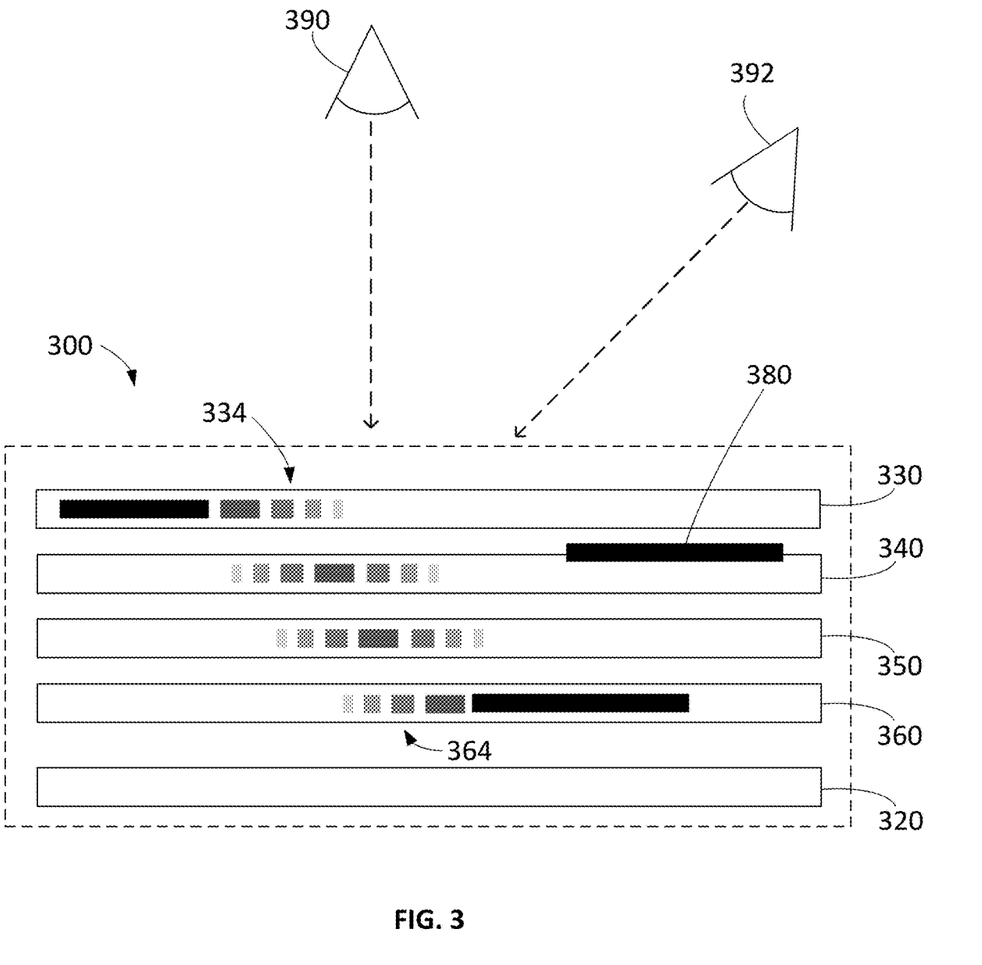
FIG. 3 illustrates a display system according to another embodiment of the present disclosure.

FIG. 3 illustrates a display system 300 according to an embodiment of the present disclosure. Similar to FIG. 1, the display system 300 may include light source 320, a front display screen 330, a rear display screen 360, and a plurality of additional display screens 340 and 350. The front display screen 330 may be a screen that is nearest to the observer 390 and the rear display screen 360 may be a screen that is adjacent and/or nearest to the light source or backlight 320. The plurality of additional display screens 340 and 350 may be disposed between the front display screen 330 and the rear display screen 360. While FIG. 3 illustrates two additional display screens, embodiment of this disclosure are not so limited and may include additional display screens between the front display screen 330 and the rear display screen 360, and/or behind the rear display screen 360.

The front display screen 330 may be controlled by a processing system to display a first graphic 332 including a front gradient 334. The rear display screen 360 may be controlled by the processing system to display a second graphic 362 including a rear gradient 364. The plurality of additional display screens 340 and 350 may each be controlled to display a different gradient. As illustrated in FIG. 3, the front gradient 334 may not overlap the rear gradient 364. In another embodiment, the front gradient 334 may overlap only a portion of the rear gradient 364.

When the gradients are viewed by an observer 390 from a direction perpendicular to a focal plane of one display screen, the displayed gradients of the display screens 340 and 350 may at least partially overlap each other and/or at least partially overlap one or both of the gradients displayed in the front display screen 330 and the rear display screen 360. The combination of the gradients may provide a seamless blending of the objects displayed on the different screens.

As illustrated in FIG. 3, an observer 392, viewing the display 300 at an off-axis angle (e.g., 30 or 45 degrees from normal) to the focal plane of one display screen, may see a seamless graphic without breaks in perceived three-dimensional image. In addition, the combination of gradients may provide for a volumetric blended surface of the displayed three-dimensional object.

The gradients displayed in multiple display screens may correspond to a common surface of a three-dimensional object. In one embodiment, the gradients displayed in the multiple display screens may correspond to a tapered edge of a three-dimensional object (e.g., needle or rim as discussed above), or text or other structure, displayed by the display system 300. All of the gradients illustrated in FIG. 3 may correspond to a common tapered edge and/or inclined surface.

In one embodiment, printed matter 380 may be provided at or next to one of the display screens. The printed matter 380 may be provided such that it does not transmit light generated by the light source 320. In another embodiment, the printed matter 380 may be transparent or semi-transparent. The printed matter 380 may correspond to content that does not change (e.g., a background). The printed matter may have a shape that has physical depth.

Figure 4:
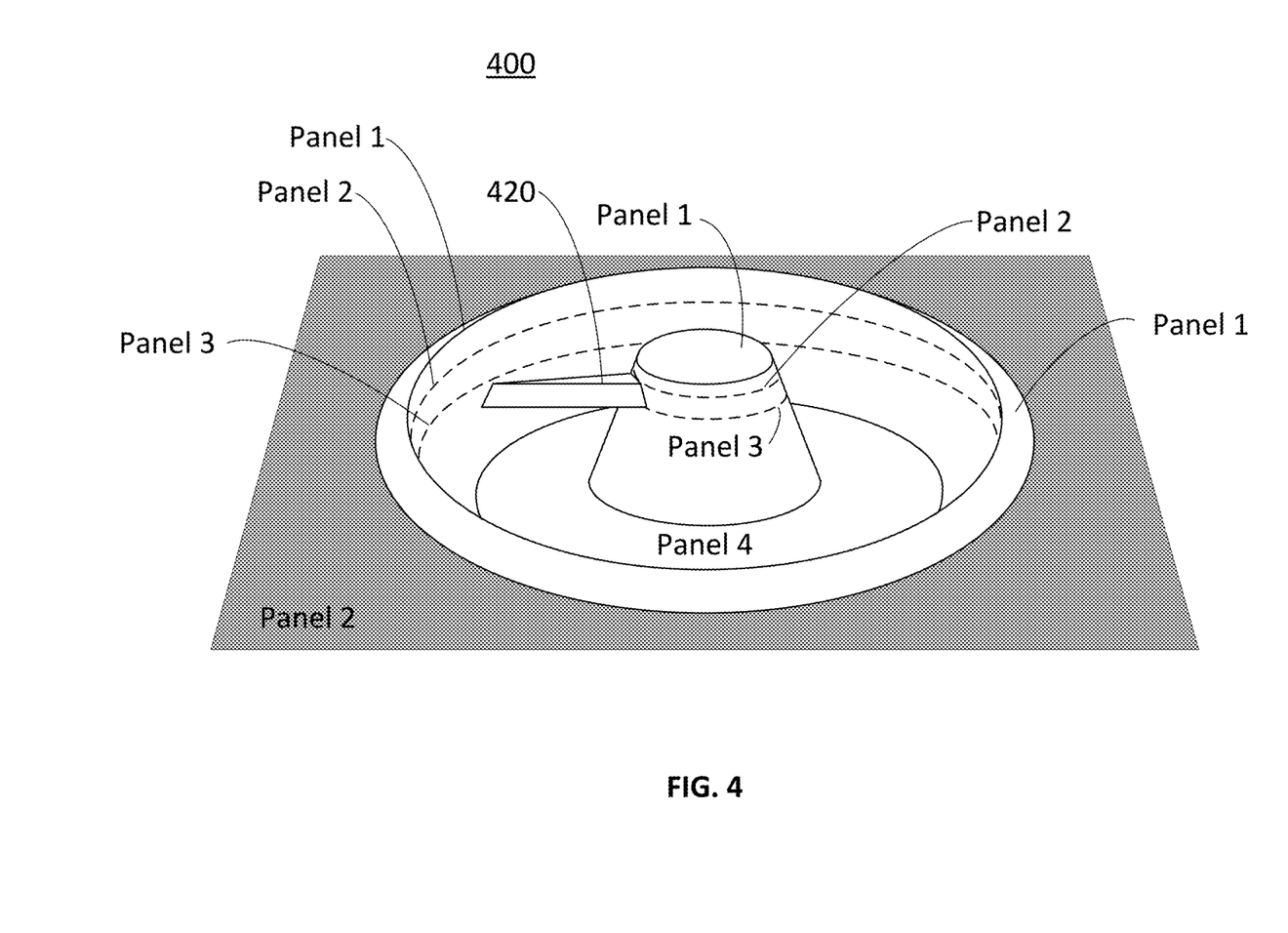
FIG. 4 illustrates a three-dimensional dial gauge that may be displayed using a multi-layer display system according to any of FIG. 1-3 or 5-7.

FIG. 4 illustrates a three-dimensional dial gauge 400 that may be displayed using a multi-layer display system according to an embodiment of the present disclosure. The dial gauge 400 may be part of a three-dimensional instrument panel displayed using a four panel display system. Different portions of the dial gauge 400 may be displayed on different display panels of the four layer display system. While FIG. 4 illustrates using a four panel display system, three panel display system or a system including more than four panels may be used to display the three-dimensional dial gauge 400.

As illustrated in FIG. 4, the dial gauge includes numerous structures with inclined/slanged surfaces, including the needle 420, the inner rim, and the outer rim that surrounds the needle. Gradients herein may be used to portray to a viewer/observer such inclined surfaces in a three dimensional manner, both at normal and off-axis viewing angles. An inclined/slanted surface of the dial gauge 400 may be displayed by generating different gradients for display on each of the four display panels, respectively. An observer viewing the combination of gradients displayed simultaneously may observe a slanted surface that extends between the first panel and the fourth panel that are physically displaced from each other, both at a normal viewing angle and at off-axis viewing angles.

In certain example embodiments, three dimensional objects may be displayed using two or more panels between the first panel and the fourth panel. For example, the needle 420 may be displayed by displaying graphics on the second panel and the third panels, on the first and second panels, on the first, second and third panels, or on the second, third and fourth panels. A graphic of a top surface of the needle 420 may be displayed on the second panel and a graphic of a bottom and/or inclined surface of the needle 420 may be displayed on the third and/or fourth panel(s). A slanted surface of the needled may be displayed by generating a first gradient for display on the second panel and a second and/or third gradient for display on the third and/or fourth panel(s), with the first gradient overlapping the second and/or third gradient(s). With this arrangement, the needle may be displayed with the perception of the needle floating in a space in a three dimensional manner. The needle may be displayed as having actual depth and may appear as having a 3D profile due to being tapered at the edges, rather than just being flat in appearance.

While not illustrated in FIG. 4, text and/or numbers may be displayed on one or more panels. For example, numbers may be displayed next to the slanted surface of the dial 400 on a second panel and a gradient may be displayed on the second panel and the third panel to provide a tapered edge to the text and/or number. The text and/or numbers may be displayed as having actual depth across two layers and may appear as having a 3D profile due to being tapered at the edges, rather than just being flat in appearance. Displaying the text and/or numbers on panels 2 and/or 3 may allow for the text and/or numbers to appear as floating between the first panel and the fourth panel.

The needle 420 may be moved in in response to instructions from a processing system. The needle 420 may move based on data captured by one or more sensors and transmitted to the processing system. For example, the needle 420 (including its gradient discussed herein) may be moved to indicate speed of a vehicle, RPMs, time, oil pressure, temperature of a vehicle fluid, fuel level, or the like.

Figure 5:
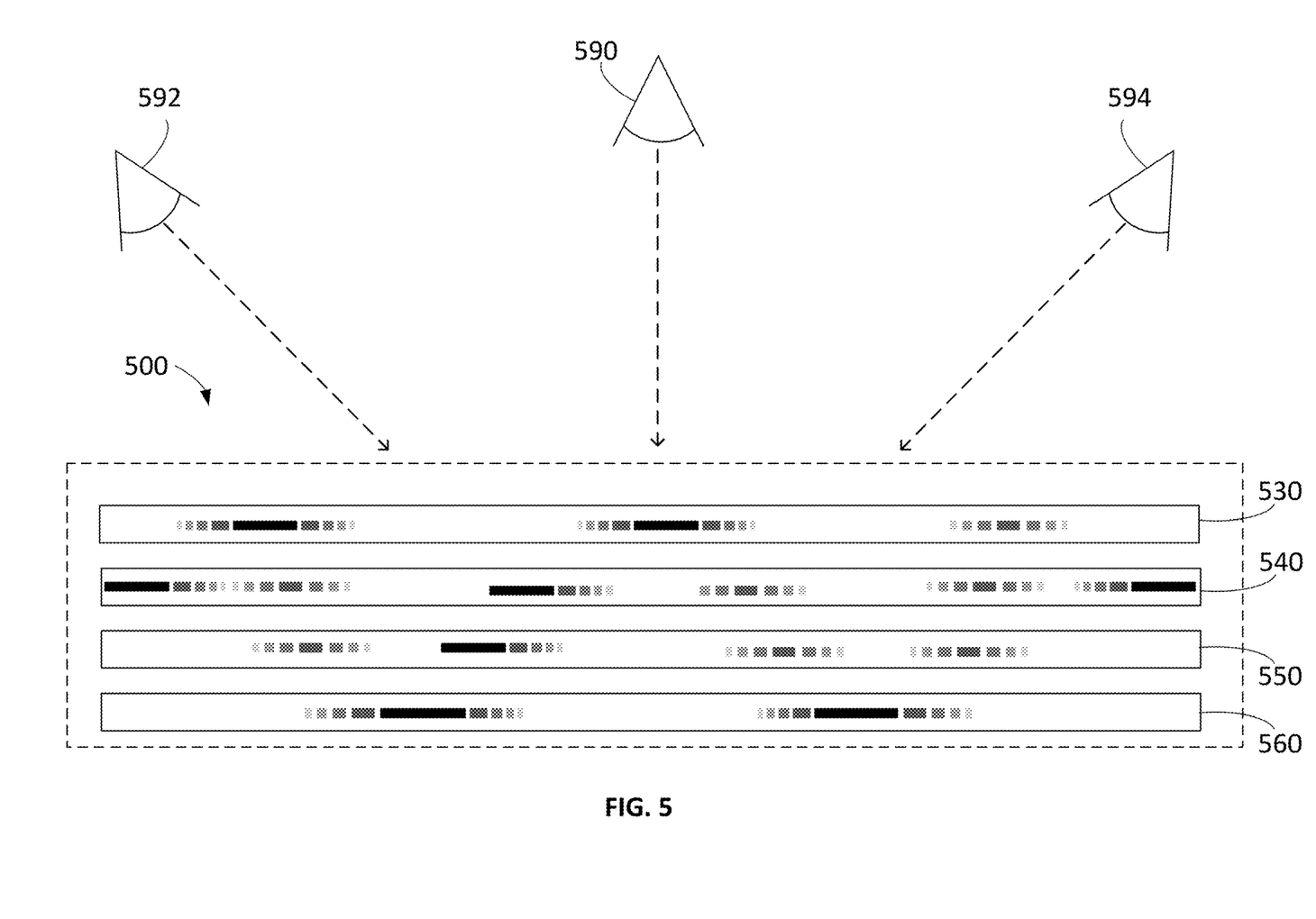
FIG. 5 illustrate a cross sectional view of a multi-layer display system displaying a dial according to an embodiment of this disclosure.

FIG. 5 illustrate a cross sectional view of a multi-layer display system 500 displaying a dial according to an embodiment of this disclosure. The multi-layer display system 500 may include four display screens. The multi-layer display system 500 may include a first display screen 530, a second display screen 540, a third display screen 550, and a fourth display screen 560. As with FIGS. 1 and 3-4, the dial gauge of FIG. 4 displayed by the multi-layer display system 500 in the manner discussed herein.

As illustrated in FIG. 5, each display screen may display an image with a plurality of graphics. The graphics may include gradient near the edges that correspond to gradients that are displayed on one or more other display screens. The combination of gradients on two or more display screens may display a slanted surface that is perceived as having a three dimensional shape due to the physical displacement of the display screens.

The close spacing between the display screens 530-560 may allow for reduced parallax. The reduced parallax may reduce the displacement in appearance of position of objects viewed from different lines of sights (e.g., see observers 590, 592 and 594). The close spacing between the display screens 530-560 may allow for finer blending within smaller regions. For example, a thin rim/bezel around a dial may be displayed. Another benefit is that smaller text may be displayed with tapered edges due to the closer spacing between the display screens 530-560. In one embodiment, the spacing between the display screens 530-560 may be adjusted (manually or automatically) based on the type of information to be displayed on the display screens 530-560.

The display screens 530-560 may be controlled to display buttons with small depth due the close spacing between the display screens 530-560. The depth of the buttons may be changed by using additional display screens to display the buttons. Accordingly, more realistic buttons may be displayed without break of angle due to the small depth. In one embodiment, a button may be displayed on the second display screen 540 and the third display screen 550 without having to traverse the full depth of the display system (e.g., full depth between the first display screen 530 and the fourth display screen 560).

Including the additional display screen between the first display screen 530 and the fourth display screen 560, may allow for more realistic animations. For example, a more realistic bottom press may be simulated because there are more layers to illustrate the transition from one display screen to another display screen. The button press simulation may include moving a displayed button from one display screen (e.g., a first display screen 530) to another overlapped display screen (e.g., a second display screen 540), in response to an input. In one embodiment, the input may be touch input to the first display screen 530.

The close spacing between the display screens 530-560 may allow for smoother transition between display screens when displayed objects are looming. For example, as the size of the displayed object is increased, the display screens on which the object is displayed can be changes such that the object is moved closer to an observer. In another example, as the size of the displayed object is decreased, the display screens on which the object is displayed can be changes such that the object is moved further away from an observer. In addition, popping may be defined with more granularity, for example, between the second display screen 540 and the third display screen 550.

The increased number of display screens 530-560 may provide for different depth to be displayed for different objects depending on the relative size of the objects. This may provide for maintaining a proper width to aspect ratios of the displayed objects. For example, a large dial gauge may be displayed with a rim that is larger as compared to a smaller dial displayed with a smaller rim. The larger rim may be displayed using gradients displayed on four display screens and the smaller rim may be displayed using gradients displayed on only two adjacent display screens. Thus, the larger rim may have a larger depth as compared to the smaller rim.

Including multiple display screens between the first display screen 530 and the fourth display screen 560, may allow to present information to an observer in a more efficient and appealing manner. For example, if navigation information (e.g., image of a map) is displayed on one of the display screens (e.g., on a fourth display screen 560), a navigation objects (e.g., arrow) may be placed closer to the observer on a display screen immediately next to and overlapping the display screen displaying the navigation information. Thus, the navigation object may be displayed without introducing parallax issues. The navigation object may be displayed using two or more display screens to provide the navigation object with three-dimensional information.

Additional multiple display screens between the first display screen 530 and the fourth display screen 560, may allow for extra cues to be displayed to distinguish content classes or importance. For example, ambient information (e.g., engine temperature) may be displayed with a first color (e.g., green) to illustrate an OK mode on one of the back display screens (e.g., a fourth display screen 560). When the temperature increases, the ambient information may be displayed with another color (e.g., yellow to illustrates a warning) on another display screen that is closer to an observer. When the temperature increases above a predetermined limit (e.g., dangerous limit), the ambient information may be displayed with another color (e.g., red) on a display screen that is closes to an observer (e.g., a first display screen 530).

While in FIG. 5 each display screens is illustrated as being completely overlapped by other panels, in one embodiment one or more display screens may only partially overlap another display screen and/or may have a portion that is not overlapped by any other display screen.

Figure 6:
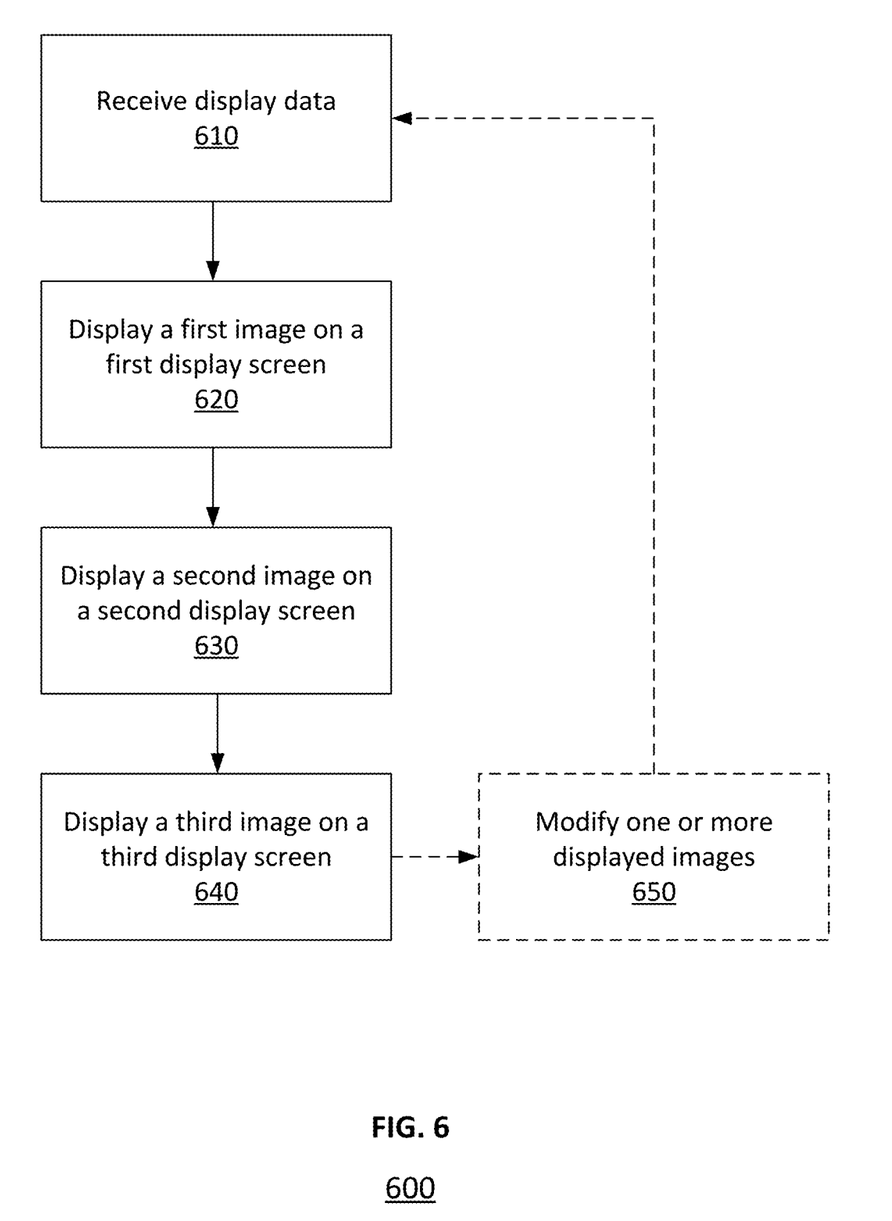
FIG. 6 illustrates a method for displaying information on a multi-layer display system according to any of FIGS. 1-5.

FIG. 6 illustrates a system/method 600 for displaying information on a multi-layer display system according to an embodiment of the present disclosure. The method may be performed by a processing system including one or more hardware processors and/or memory. The method 600 may include receiving display data 610, displaying a first image on a first display screen 620, displaying a second image on a second display screen 630, and displaying a third image on a third display screen 640. The method 600 may further include modifying one or more of the displayed images 650.

The received display data may be retrieved from memory coupled to a processing system and/or from another device. The display data may be received over a network which may be wireless. The received display data may include a plurality of images for display on different display screens simultaneously. Each of the images may include a graphic and/or a gradient portion. In one embodiment one or more of the images may include a plurality of graphics and each of the graphics may be a separate from each other. The display data may include a sequence of images (e.g., video) and/or text for display on the one or more display screens. Each of the images may include one or more of objects, text, and/or animations. The display data may be periodically or continuously received with updated information for display.

In one embodiment, the received display data may include a single image and the first, second and third images may be generated from the single received image. For example, the processing system may segment the received image to provide different portions of the received image to be displayed on the first and second display screens. The processing system may further generate gradients to be displayed on the first, second and third display screens to display features with a perception of three-dimensions due to the displacement of the display screens.

The method 600 may include displaying, using the received display data, a first image on a first display screen, and a second image on a second display screen arranged in an overlapping manner with the first display screen. The first image may include a gradient area and the second image may include a gradient area that corresponds to the first gradient area. The first gradient area and the second gradient area may at least partially overlap. In another embodiment, the first gradient area and the second gradient area may be displayed without overlapping when viewed from a direction perpendicular to a focal plane of the first or second display screen.

The third display screen may be arranged in an overlapping manner between the first display screen and the second display screen. The third image displayed on the third display screen may include a third gradient area overlapping at least a portion of the first gradient area displayed on the first display screen and at least a portion of the second gradient area displayed on the second display screen. In one embodiment, the third gradient may completely overlap the first gradient area and the second gradient area.

The first gradient area, the second gradient area, and the third gradient area may represent a common surface of a three-dimensional object displayed by the display system. In one embodiment, the first gradient area, the second gradient area, and the third gradient area may correspond to a tapered edge of a three-dimensional object displayed by the display system. In another embodiment, the combination of the first image, the second image, and the third image may display three-dimensional text, and the first gradient area, the second gradient area, and the third gradient area correspond to tapered edges of the three-dimensional text.

The method 600 may include displaying graphics and/or images on additional display layers provided in an overlapping manner between the first display screen and the second display screen.

Modification of the displayed images may be made in response to instructions received from an observer or instructions from a processing system. The instructions may include reducing or increasing the depth of displayed objects. The depth of displayed objects may be increased by using additional display screens to display the objects. For example, to increase the perceived depth, a portion of an object displayed on one display screen may be moved to an overlapped display screen that is further away from the observer and a gradient may be displayed in place of the object. In another embodiment, a portion of an object displayed on one display screen may be moved to an overlapping display screen that is closer to the observer and a gradient may be displayed in place of the object.

Figure 7:
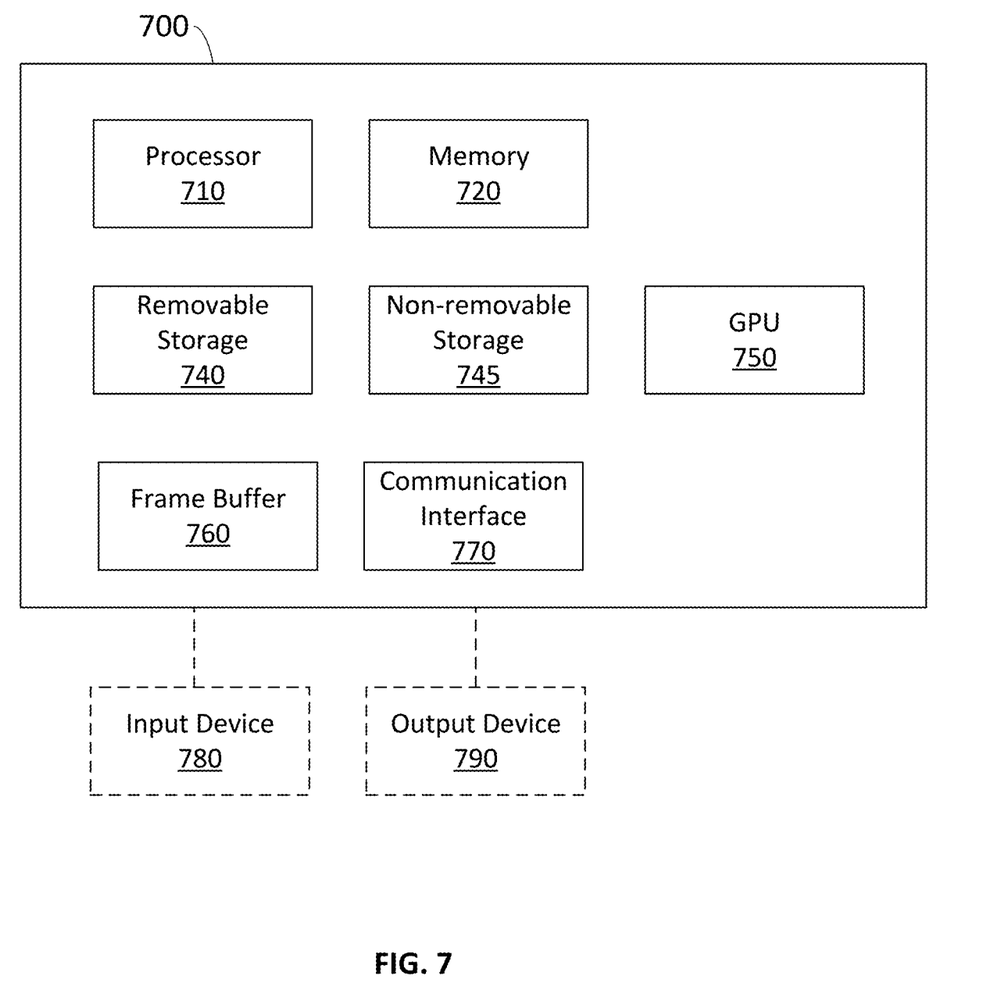
FIG. 7 illustrates an exemplary processing system upon which embodiments of the present disclosure(s) may be implemented, such as FIGS. 1-6.

FIG. 7 illustrates an exemplary processing system 700 upon which embodiments of the present disclosure(s) may be implemented. The processing system 700 may include one or more processors 710 and memory 720. The processor 710 may comprise a central processing unit (CPU) or other type of processor. Depending on the configuration and/or type of computer system environment, the memory 720 may comprise volatile memory (e.g., RAM), non-volatile memory (e.g., ROM, flash memory, etc.), or some combination of the two. Additionally, memory 720 may be removable, non-removable, etc.

In other embodiments, the processing system may comprise additional storage (e.g., removable storage 7410, non-removable storage 745, etc.). Removable storage 740 and/or non-removable storage 745 may comprise volatile memory, non-volatile memory, or any combination thereof. Additionally, removable storage 740 and/or non-removable storage 745 may comprise CD-ROM, digital versatile disks (DVD) or other optical storage, magnetic cassettes, magnetic tape, magnetic disk storage or other magnetic storage devices, or any other medium which can be used to store information for access by processing system 700.

As illustrated in FIG. 7, the processing system 700 may communicate with other systems, components, or devices via communication interface 770. Communication interface 770 may embody computer readable instructions, data structures, program modules or other data in a modulated data signal (e.g., a carrier wave) or other transport mechanism. By way of example, communication interface 770 may be couple to wired media (e.g., a wired network, direct-wired connection, etc.) and/or wireless media (e.g., a wireless network, a wireless connection utilizing acoustic, RF, infrared, or other wireless signaling, etc.).

Communication interface 770 may also couple the processing system 700 to one or more input devices 780 (e.g., a keyboard, mouse, pen, voice input device, touch input device, etc.) and/or output devices 790 (e.g., a display, speaker, printer, etc.). The input devices 790 may be used by an observer to manipulate the way information is displayed on an output device 790 and/or what information and/or graphics are displayed in different portion of the output device 790. In one embodiment, communication interface 770 may couple the processing system 700 to a display including three or more display panels arranged in an overlapping manner.

As shown in FIG. 7, a graphics processor 750 may perform graphics/image processing operations on data stored in a frame buffer 760 or another memory of the processing system. Data stored in frame buffer 760 may be accessed, processed, and/or modified by components (e.g., graphics processor 750, processor 710, etc.) of the processing system 700 and/or components of other systems/devices. Additionally, the data may be accessed (e.g., by graphics processor 750) and displayed on an output device coupled to the processing system 700. Accordingly, memory 720, removable storage 740, non-removable storage 745, frame buffer 760, or a combination thereof, may comprise instructions that when executed on a processor (e.g., 710, 750, etc.) implement a method of processing data (e.g., stored in frame buffer 760) for improved display quality on a display.

As shown in FIG. 7, portions of the present invention may be comprised of computer-readable and computer-executable instructions that reside, for example, in a processing system 700 and which may be used as a part of a general purpose computer network (not shown). It is appreciated that processing system 700 is merely exemplary. As such, the embodiment in this application can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

The exemplary embodiments of the present disclosure provide the invention(s), including the best mode, and also to enable a person skilled in the art to practice the invention, including making and using any devices or systems and performing any incorporated methods. While specific exemplary embodiments of the present invention(s) are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s).

In an example embodiment of this invention, there is provided a multi-layer display system for displaying three-dimensional images, comprising: at least first, second, and third display screens arranged in a substantially parallel and overlapping manner; a light source configured to provide light to at least one of the display screens; and a processing system comprising at least one processor and memory, the processing system configured to: display on the first display screen a first image including a first gradient area; display on the second display screen a second image including a second gradient area; display on the third display screen a third image including a third gradient area overlapping at least a portion of the first gradient area and at least a portion of the second gradient area, wherein the third display screen is provided between at least the first and second display screens, so that at least the first, second, and third gradient areas of at least the first, second, and third display screens, respectively, can form a gradient configured to one or more of: (a) portray an inclined surface of an object to a viewer in a three dimensional graded manner with color of the inclined surface of the object progressively changing from a first level closer to the viewer to a different second level farther from the viewer, and/or (b) portray an object in an opaque-to-transparent graded manner so that a first portion of an object appears opaque or substantially opaque and the gradient fades the object so that a second portion of the object appears transparent or more transparent than does the first portion of the object.

In the display system of the immediately preceding paragraph, the first level may be a brighter level of the color than is the second level, or the first level may be a lighter level of the color than is the second level.

In the display system of any of the preceding two paragraphs, the first level may be white or light grey, and the second level may be dark grey or black; or alternatively the first level may be red and the second level may be a darker red than red of the first level.

In the display system of any of the preceding three paragraphs, the object may be a needle of a vehicle dash gauge, or the object may be a rim of a vehicle dash gauge, for example.

In the display system of any of the preceding four paragraphs, the first gradient area, the second gradient area, and the third gradient area may represent a common inclined surface of the object, which is to be portrayed as a three-dimensional object to a viewer.

In the display of any of the preceding five paragraphs, the first gradient area, the second gradient area, and the third gradient area may correspond to a tapered edge of the object.

In the display system of any of the preceding six paragraphs, the processing system may be further configured to display a button on the first display screen, and in response to an input corresponding to the displayed button, move the displayed button on the first display screen to a display screen overlapped by the first display screen.

In the display system of any of the preceding seven paragraphs, two or more displays screens may be arranged in an overlapping manner between the first display screen and the second display screen.

In the display system of any of the preceding eight paragraphs, there may further be a fourth display screen between the second and third display screens, for displaying a fourth gradient area, so that at least the first, second, third, and fourth gradient areas of at least the first, second, third and fourth display screens, respectively, can form the gradient for portraying the inclined surface of the object to a viewer in a three dimensional graded manner with color of the inclined surface of the object progressively changing from the first level closer to the viewer to the different second level farther from the viewer.

In the display system of any of the preceding nine paragraphs, the display screens may each be a separate and distinct liquid crystal display panel.

In the display system of any of the preceding ten paragraphs, printed matter (e.g., text for a gauge, such as speed values, RPM values, fuel levels, etc.) may be provided between any of the display screens.

The invention claimed is:

1. A multi-layer display system for displaying three-dimensional images, comprising: at least first, second, and third display screens arranged in a substantially parallel and overlapping manner; a light source configured to provide light to at least one of the display screens; and a processing system comprising at least one processor and memory, the processing system configured to: display on the first display screen a first image including a first gradient area; display on the second display screen a second image including a second gradient area; display on the third display screen a third image including a third gradient area overlapping at least a portion of the first gradient area and at least a portion of the second gradient area, wherein the third display screen is provided between at least the first and second display screens, so that at least the first, second, and third gradient areas of at least the first, second, and third display screens, respectively, can form a gradient configured to one or more of: (a) portray an inclined surface of an object to a viewer in a three dimensional graded manner with color of the inclined surface of the object progressively changing from a first level closer to the viewer to a different second level farther from the viewer, and/or (b) portray an object in an opaque-to-transparent graded manner so that a first portion of the object appears opaque or substantially opaque and the gradient fades the object so that a second portion of the object appears transparent or more transparent than does the first portion of the object, wherein the processing system is further configured to display a button on the first display screen, and in response to an input corresponding to the displayed button, move the displayed button on the first display screen to a display screen overlapped by the first display screen.

2. The display system according to claim 1, wherein at least the first, second, and third gradient areas of at least the first, second, and third display screens, respectively, are configured to portray the inclined surface of the object to a viewer in a three dimensional graded manner with color of the inclined surface of the object progressively changing from the first level closer to the viewer to the different second level farther from the viewer.

3. The display system according to claim 2, wherein the first level is a brighter level of the color than is the second level.

4. The display system according to claim 2, wherein the first level is a lighter level of the color than is the second level.

5. The display system of claim 2, wherein the first level is white or light grey, and the second level is dark grey or black.

6. The display system of claim 2, wherein the first level is red, and the second level is a darker red than red of the first level.

7. The display system of claim 1, wherein the object is a needle of a vehicle dash gauge.

8. The display system of claim 1, wherein the object is a rim of a vehicle dash gauge.

9. The display system of claim 1, wherein at least the first, second, and third gradient areas of at least the first, second, and third display screens, respectively, can form a gradient configured to portray the object in an opaque-to-transparent graded manner so that the first portion of the object appears opaque or substantially opaque and the gradient fades the object so that the second portion of the object appears transparent or more transparent than does the first portion of the object.

10. The display system of claim 1, wherein the first gradient area, the second gradient area, and the third gradient area represent a common inclined surface of the object, which is to be portrayed as a three-dimensional object to a viewer.

11. The display system according to claim 1, wherein the first gradient area, the second gradient area, and the third gradient area correspond to a tapered edge of the object.

12. The display system according to claim 1, wherein two or more displays screens are arranged in an overlapping manner between the first display screen and the second display screen.

13. The display system according to claim 1, further comprising a fourth display screen between the second and third display screens, for displaying a fourth gradient area, so that at least the first, second, third, and fourth gradient areas of at least the first, second, third and fourth display screens, respectively, can form the gradient for portraying the inclined surface of the object to a viewer in a three dimensional graded manner with color of the inclined surface of the object progressively changing from the first level closer to the viewer to the different second level farther from the viewer.

14. The display system of claim 1, wherein each of the display screens is a liquid crystal display panel.

15. The display system of claim 1, wherein printed matter is provided between the second and third display screens.

16. A method of using a multi-layer display system for displaying three-dimensional images, the method comprising: having at least first, second, and third display screens arranged in a substantially parallel and overlapping manner; displaying on the first display screen a first image including a first gradient area; displaying on the second display screen a second image including a second gradient area; displaying on the third display screen a third image including a third gradient area, wherein the third display screen is provided between at least the first and second display screens, so that at least the first, second, and third gradient areas of at least the first, second, and third display screens, respectively, form a gradient that one or more of: (a) portrays an inclined surface of an object to a viewer in a three dimensional graded manner with color of the inclined surface of the object progressively changing from a first eve closer to the viewer to a different second level farther from the viewer, and/or (b) portrays an object in an opaque-to-transparent graded manner so that a first portion of the object appears opaque or substantially opaque and the gradient fades the object so that a second portion of the object appears transparent or more transparent than does the first portion of the object, and wherein the multi-layer display system is configured to display a button on the first display screen, and in response to an input corresponding to the displayed button, move the displayed button on the first display screen to a display screen overlapped by the first display screen.

17. The method of claim 16, wherein at least the first, second, and third gradient areas of at least the first, second, and third display screens, respectively, form a gradient that portrays the inclined surface of the object to a viewer in a three dimensional graded manner with color of the inclined surface of the object progressively changing from the first level closer to the viewer to the different second level farther from the viewer.

18. The method of claim 17, wherein the first level is a brighter level of color than is the second level.

19. The method of claim 17, wherein the first level is white or light grey, and the second level is dark grey or black.

20. The method of claim 16, wherein the object is a needle of a vehicle dash gauge.

21. The method of claim 16, wherein the object is a rim of a vehicle dash gauge.

22. The method of claim 16, wherein at least the first, second, and third gradient areas of at least the first, second, and third display screens, respectively, form a gradient that portrays the object in an opaque-to-transparent graded manner so that a first portion of the object appears opaque or substantially opaque and the gradient fades the object so that a second portion of the object appears transparent or more transparent than does the first portion of the object.

23. The method of claim 16, further comprising displaying a fourth gradient area via a fourth display screen provided between the second and third screens, so that at least the first, second, third, and fourth gradient areas of at least the first, second, third and fourth display screens, respectively, form the gradient for portraying the inclined surface of the object to a viewer in a three dimensional graded manner with color of the inclined surface of the object progressively changing from the first level closer to the viewer to the different second level farther from the viewer.

24. A multi-layer display system for displaying three-dimensional images, comprising:
at least first, second, and third display screens arranged in a substantially parallel and overlapping manner;
wherein the first, second, and third display screens are configured to:
display on the first display screen a first image including a first gradient area;
display on the second display screen a second image including a second gradient area;
display on the third display screen a third image including a third gradient area overlapping at least a portion of the first gradient area and at least a portion of the second gradient area, wherein the third display screen is provided between at least the first and second display screens, so that at least the first, second, and third gradient areas of at least the first, second, and third display screens, respectively, can form a gradient configured to one or more of: (a) portray an inclined surface of an object to a viewer in a three dimensional graded manner with color of the inclined surface of the object progressively changing from a first level closer to the viewer to a different second level farther from the viewer, and/or (b) portray an object in an opaque-to-transparent graded manner so that a first portion of the object appears opaque or substantially opaque and the gradient fades the object so that a second portion of the object appears transparent or more transparent than does the first portion of the object, and wherein the multi-layer display system is configured to display a button on the first display screen, and in response to an input corresponding to the displayed button, move the displayed button on the first display screen to a display screen overlapped by the first display screen.

\* \* \* \* \*